United States Patent
Reese et al.

[11] Patent Number: 5,993,934
[45] Date of Patent: Nov. 30, 1999

[54] NEAR ZERO CTE CARBON FIBER HYBRID LAMINATE

[75] Inventors: Robert P. Reese, Churchville; Terry W. Gossard, Jr., Honeoye Falls, both of N.Y.

[73] Assignee: Eastman Kodak Company, Rochester, N.Y.

[21] Appl. No.: 08/906,745

[22] Filed: Aug. 6, 1997

[51] Int. Cl.⁶ .................................................. B32B 5/12
[52] U.S. Cl. ........................ 428/113; 428/114; 428/408; 428/902; 343/912; 343/897; 264/115; 264/122; 264/136
[58] Field of Search .................................. 428/113, 114, 428/408, 902; 343/912, 897; 264/115, 122, 136

[56] References Cited

U.S. PATENT DOCUMENTS

| | | | |
|---|---|---|---|
| 4,888,247 | 12/1989 | Zweben et al. | 428/105 |
| 4,995,698 | 2/1991 | Myers | 350/96.29 |
| 5,045,299 | 9/1991 | Takahashi et al. | 423/447.4 |
| 5,192,475 | 3/1993 | Tredway | 264/115 |
| 5,229,196 | 7/1993 | Seibold et al. | 428/241 |
| 5,270,869 | 12/1993 | O'Brien et al. | 359/820 |
| 5,270,870 | 12/1993 | O'Brien et al. | 359/820 |
| 5,382,309 | 1/1995 | Seibold et al. | 156/242 |
| 5,383,062 | 1/1995 | Sato et al. | 359/894 |
| 5,426,714 | 6/1995 | Gadkaree et al. | 385/39 |
| 5,465,023 | 11/1995 | Garner | 313/293 |
| 5,554,430 | 9/1996 | Pollatta et al. | 428/113 |
| 5,593,752 | 1/1997 | Pollatta et al. | 428/114 |
| 5,597,435 | 1/1997 | Desautels et al. | 156/245 |
| 5,686,930 | 11/1997 | Brydon | 343/912 |

FOREIGN PATENT DOCUMENTS

| | | | |
|---|---|---|---|
| 0 640 653 A2 | 8/1994 | European Pat. Off. | C08L 63/00 |
| 0 672 517 A1 | 3/1995 | European Pat. Off. | B29C 70/22 |

OTHER PUBLICATIONS

Robert M. Jones, *Mechanics of Composite Materials*, Scritpa Book Co., 1975, Chapter 3, pp. 85–145.
Robert M. Jones, *Mechanics of Composite MAterials*, Scripta Book Co., 1975, Chapter 4, pp. 147–156.

*Primary Examiner*—William Krynski
*Assistant Examiner*—B. Shewareged
*Attorney, Agent, or Firm*—Thomas H. Close

[57] ABSTRACT

A carbon fiber hybrid laminate includes a first group of carbon fiber reinforced laminae having a positive CTE and, second group of carbon fiber reinforced laminae having a negative CTE, wherein the hybrid laminate has a tailorable in-plane CTE in the range of $\pm 0.2 \times 10^{-6}$ in/in/° F.

6 Claims, 8 Drawing Sheets

FIG. 4

UNIDIRECTIONAL LAMINA PROPERTIES

| Fiber | $E_{11}$(Msi) | $E_{22}$(Msi) | $G_{12}$(Msi) | $v_{12}$ | $CTE_{11}$(μin/in/°F) | $CTE_{22}$(μin/in/°F) | Fiber Vol. (%) |
|---|---|---|---|---|---|---|---|
| M40J | 29.4 | 1.19 | 0.43 | 0.26 | −0.391 | 15.55 | 62.0 |
| M60J | 50.3 | 1.07 | 0.43 | 0.26 | −0.640 | 17.55 | 62.0 |

FIG. 5

LAMINATE ANALYSIS EXAMPLES

| STACKING SEQUENCE | M40J Ply Thickness (in) | M60J Ply Thickness (in) | $E_{11}$ (Msi) | $E_{22}$ (Msi) | $CTE_{11}$ (μin/in/°F) | $CTE_{22}$ (μin/in/°F) | Fiber Vol. (%) |
|---|---|---|---|---|---|---|---|
| [(−45/+45/0/90)M40J/ (−45/+45/0/90)M60J]s | 0.002 | 0.002 | 14.0 | 14.0 | 0.036 | 0.036 | 62.0 |
| " | " | 0.00268 | 14.51 | 14.51 | 0.000 | 0.000 | " |
| [(+45/−45) M60J/ (0/90) M40J]s | " | 0.002 | 11.5 | 11.5 | 0.036 | 0.036 | " |
| " | " | 0.00268 | 10.47 | 10.47 | 0.000 | 0.000 | " |
| [(0/90) M60J/ (+45/−45) M40J]s | " | " | 17.7 | 17.7 | 0.000 | 0.000 | " |
| [(+44/−44) M60J/ (0/90) M40J]s | " | " | 10.85 | 10.12 | −0.064 | 0.068 | " |

NEAR ZERO CTE CARBON FIBER HYBRID LAMINATE

FIELD OF THE INVENTION

The present invention relates generally to fiber reinforced plastic laminates and particularly to such laminates having low coefficients of thermal expansion, and a method of making them.

BACKGROUND OF THE INVENTION

Carbon fiber reinforced plastic laminates are a well known class of materials that are used in structural applications ranging from rocket motor cases to golf club shafts due to its high stiffness to weight ratio and high strength to weight ratio, which can be much higher than metals. The carbon fiber laminates consist of various carbon fiber plies (laminae), oriented and stacked in a prescribed pattern (analogous to plywood) tailored to meet the structural requirements of the member. Each ply of the laminate consists of carbon fibers embedded in a plastic matrix.

One of the primary advantages of composite structures over metallic structures is that they are more tailorable to design requirements. For example, a pressure vessel has twice the load in the hoop direction than the axial direction. A metallic vessel would be sized in thickness to meet the hoop load but would be oversized for the axial loads because a metal is isotropic, that is, having the same properties in all directions. On the other hand, a composite pressure vessel could be designed with just enough fibers oriented in the hoop direction to react the hoop loads and just enough fibers oriented axially to react the axial loads. Therefore, the composite pressure vessel would be a more efficient structure due to the tailorability of the composite materials.

Optical support structures in imaging systems must possess excellent dimensional stability during testing and operations. In optical support structures, instead of tailoring the structure to react loads like a pressure vessel, the plies are oriented to optimize (control) the coefficient of thermal expansion (CTE) of the structure. In general, the design goal of an optical support structure is zero CTE or near-zero CTE. To achieve a near-zero CTE laminate using one fiber throughout the laminate in two orthogonal directions (2D laminate), a quasi-isotropic layup is typically used. The quasi-isotropic layup produces material properties (modulus, CTE, etc.) that are equal in the 2D plane of the laminate One limitation to the use of quasi-isotropic laminates composed of one material system is that the laminate can not be tailored for loads or strength as described in the pressure vessel example. A material system is composed of one fiber and one resin. Using two or more material systems, it is possible to tailor the laminate for zero CTE in both directions while retaining the ability to tailor the modulus or strength to gain efficiencies for load and stiffness.

For applications such as optical support structures, it would be desirable to produce a carbon fiber laminate with a specified in-plane CTE that is near zero and equal in all directions in the plane (quasi-isotropic). The fibers currently available will produce two dimensional carbon fiber laminates with only discrete values of CTE and modulus which are not adjustable for the needs of specific applications.

SUMMARY OF THE INVENTION

The present invention is directed to overcoming one or more of the problems set forth above. Briefly summarized, according to one aspect of the present invention, there is provided a carbon fiber hybrid laminate, comprising: an integral number of first groups of carbon fiber reinforced laminae having a positive CTE; and an integral number of second groups of carbon fiber reinforced laminae having a negative CTE wherein the hybrid laminate has an in-plane CTE in the range of $\pm 0.2 \times 10^{-6}$ in/in/° F. and the first and the second groups of carbon fiber reinforced laminae are bonded about a midplane.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

This invention will allow optical support structures to be designed with structural components that have tailorable in-plane CTEs that are tailorable in the range of $\pm 0.2 \times 10^{-6}$ in/in/° F. while also being tailorable for strength and modulus. This permits more complex optical systems to operate within more severe thermal environments.

BRIEF DESCRIPTION OF THE DRAWINGS

FIG. 4 is a table of the lamina properties of two types of carbon fibers embedded in a resin matrix;

FIG. 5 is a table of laminate properties resulting from different combinations of two types of carbon fiber laminae;

To facilitate understanding, identical reference numerals have been used in the drawings and the description of the invention to designate identical elements that are common to the figures.

DETAILED DESCRIPTION OF THE INVENTION

Figure 1:
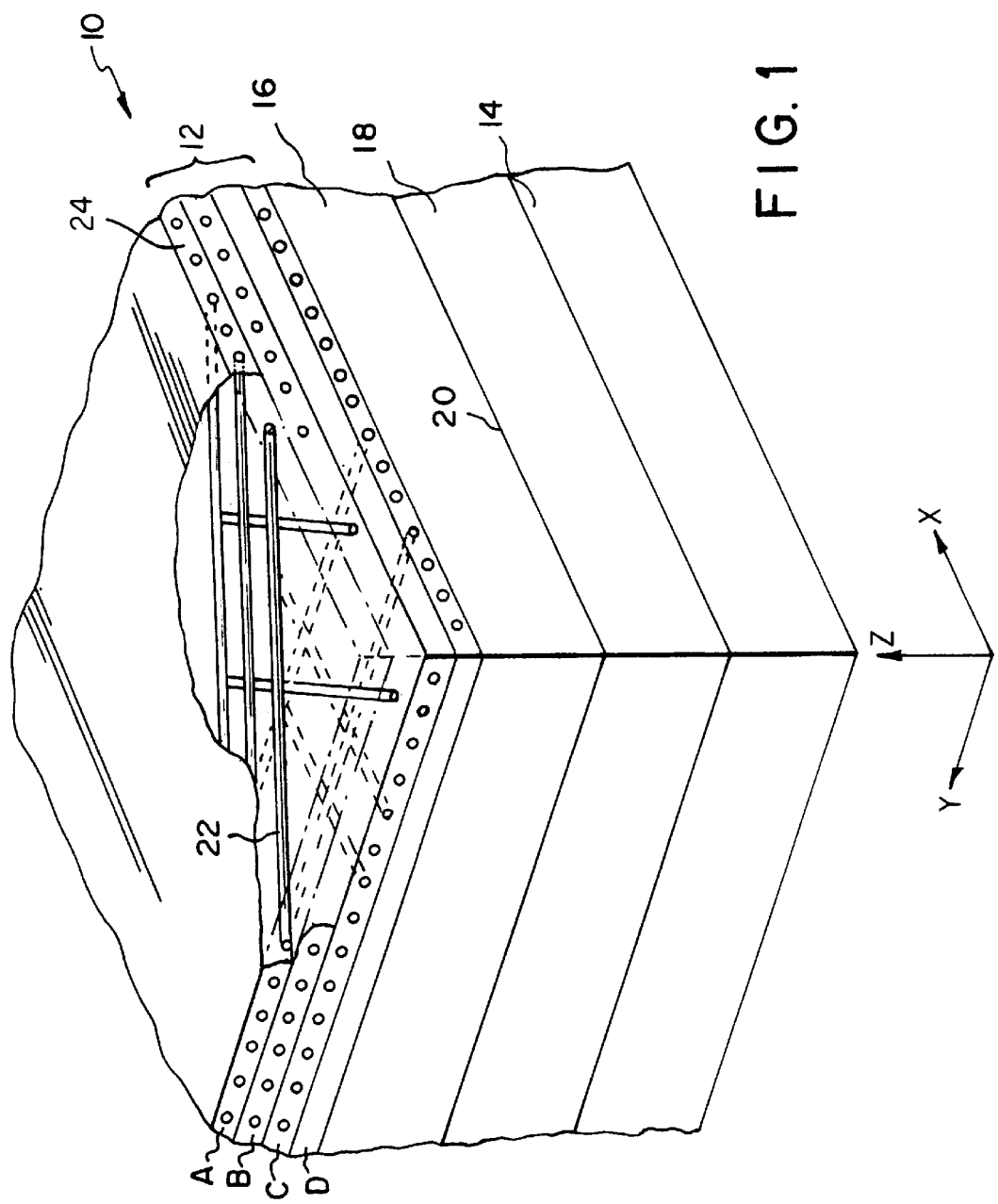
FIG. 1 is a partial perspective view of a carbon fiber hybrid laminate according to the present invention.

Referring to FIG. 1, a carbon fiber hybrid laminate 10 according to the preferred embodiment of the invention includes a first group of carbon reinforced laminae arranged in subgroups 12 and 14 having a positive CTE and a second group of carbon reinforced laminae arranged in subgroups 16 and 18 having a negative CTE. Preferably, the laminae are arranged in a symmetrical layup around a midplane 20 to prevent out-of-plane bending during curing, but a non symmetrical layup is still within the teachings of the present invention. The term "out-of-plane" referring to movement of the laminate in a direction perpendicular to the midplane. Each subgroup includes a plurality of carbon fiber laminae oriented and stacked in a prescribed pattern. For example within subgroup 12 four layers A–D are shown. Each of the layers includes carbon fibers 22 imbedded in, for example, a thermo-setting resin 24. For the embodiment shown, the fibers in layer A are at a −45 degree angle with respect to the XY coordinates shown at a base corner of the laminate 10. As used herein, the term "principle material direction" means the direction of 0 degrees parallel to the X-axis. In layer B the fibers are at a +45 degree angle, in layer C the fibers are at 0 degrees, and in layer D the fibers are at 90 degrees. The order of the layers A–D can be mixed, the only requirement is that the number of angles used must divide a circle into equal segments. In the embodiment of FIG. 1 subgroup 16 is the same as subgroup 12 with the difference being that subgroup 12 is formed with M40J carbon fibers and subgroup 16 is formed with M60J carbon fibers. The subgroups 18 and 14 are reflected about the midplane 20 such that subgroup 18 is the mirror image of subgroup 16 and likewise subgroup 14 is the mirror image of subgroup 12.

Figure 2:
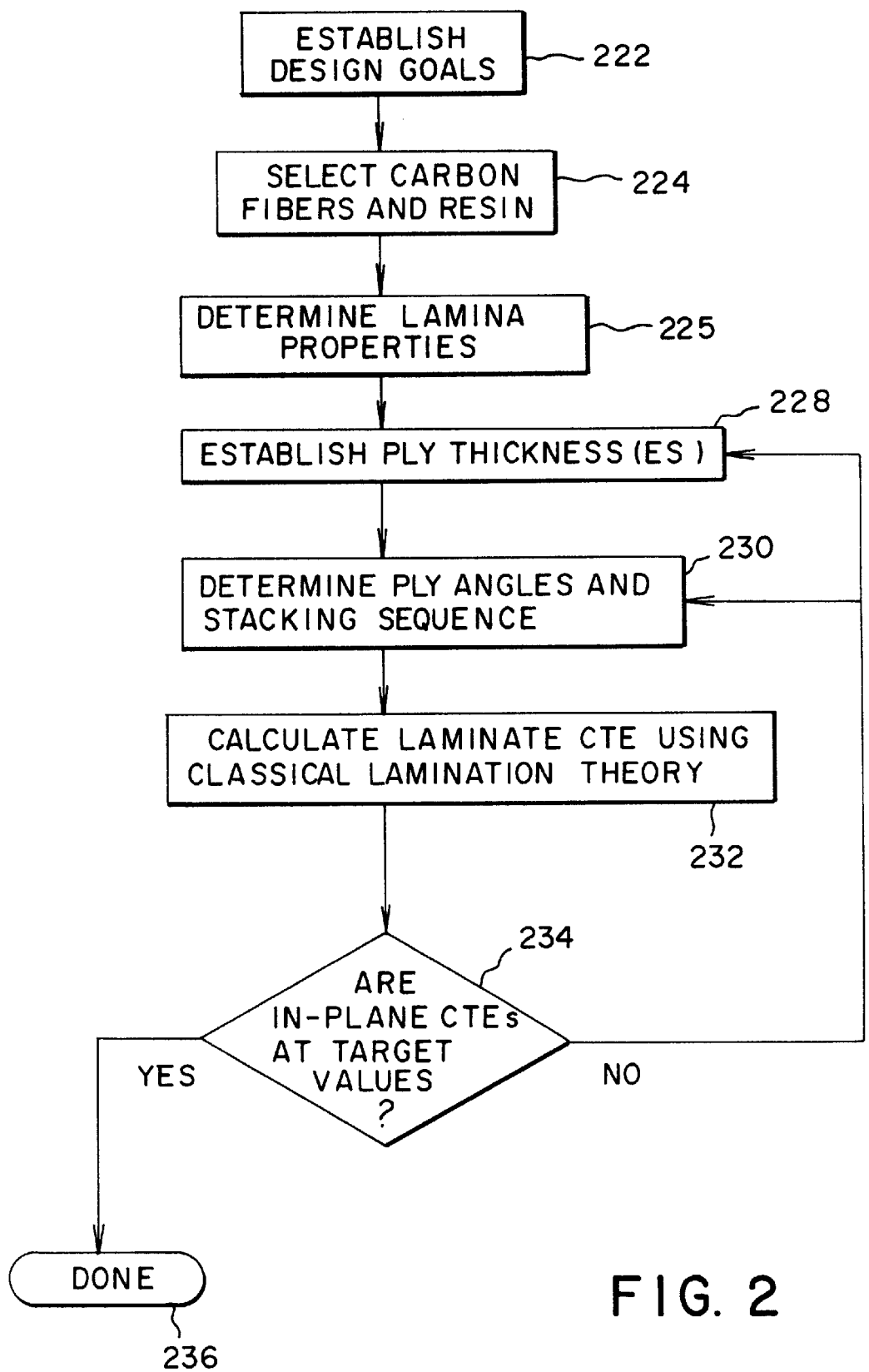
FIG. 2 is a flow chart illustrating a method of designing carbon fiber hybrid laminates according to the present invention.

Referring to FIG. 2, the choice of carbon fibers, ply thickness, ply orientation, and stacking sequence in the subgroups to prepare a carbon fiber hybrid laminate according to the present invention are determined as follows. First the design goals 222 of the laminate are established which are the desired CTE, strength, and modulus of the laminate in both the X and Y directions that achieve specified performance characteristics of the final product. The process encompasses all combinations of in-plane CTEs from +0.2× $10^{-6}$ in/in/° F. to −0.2×$10^{-6}$ in/in/° F.

Next, two types of carbon fibers having different CTEs are selected in addition to the resin system per step 224. The resin system has less of an effect on the laminate CTE than the fiber, therefore the specific resin selected is less critical. However, the resin does dominate the lamina properties transverse to the fiber and is crucial to fabrication issues, therefore the resin selected is not trivial to controlling CTE in a laminate. One type of carbon fibers must be capable of producing a laminate having a positive CTE when arranged in a quasi-isotropic fashion. The other type of carbon fiber must be capable of producing a laminate having a negative CTE when arranged in a quasi-isotropic fashion.

Next, the properties of the individual lamina of the two selected carbon fibers are determined per step 225 using well known techniques such as those specified by the American Society of Testing and Materials (ASTM) and from the carbon fiber manufacturer's specifications. Micromechanics can also be used to calculate lamina properties from the properties of the constituent fiber and resin. Micromechanics theory is detailed in chapter 3, pages 85–145 of *Mechanics of Composite Materials,* by Robert M. Jones, Scripta Book Co., 1975. The measured or calculated properties required to perform the hybrid laminate design are tensile and compressive moduli of elasticity in the fiber direction and transverse to the fiber direction, Poisson's ratio in the plane of the lamina, the in-plane shear modulus of elasticity, the fiber volume fraction of the lamina, and the CTE of the lamina in the fiber direction and transverse to the fiber direction. Combinations of measured and calculated lamina properties can be employed.

Once the lamina properties have been determined, a ply thickness for the lamina must be established per step 228. Upper and lower bounds on the ply thickness are established by the prepreg manufacturer based on the fiber areal weight, resin system selected, and prepregging equipment capabilities. Within the selected bounds, the ply thickness may be varied to adjust CTE of the laminate, alter mechanical performance, enhance design flexibility, improve manufacturability, and/or reduce cost.

Upon selecting the appropriate ply thickness, the ply angles and stacking sequence may be determined per step 230. In order to obtain a laminate that exhibits the CTE characteristics defined in the design goals per step 222, both ply angles and ply thicknesses are varied. The analysis technique employed to perform the calculations of CTE in the plane of the laminate is classical lamination theory that is performed in step 232. The technique is well established in the composite structures technical community as the proper method for determining in-plane composite properties given the constituent lamina properties. A detailed description of classical lamination theory is found in chapter 4, pages 147–156 of *Mechanics of Composite Materials,* by Robert M. Jones, Scripta Book Co., 1975. There are several software packages commercially available that perform the lamination theory calculations given the appropriate inputs.

The most efficient method for determining the appropriate stacking sequence, ply angles, and ply thickness to meet the CTE goals defined in step 222 is to first assume a quasi-isotropic, symmetric layup for each fiber/resin combination selected. Lamination theory is then used to determine the in-plane CTEs of the laminate and compare them to the design per step 234. If the goals are met, then the process is complete per step 236. However, if the design goals are not met, then first alter the ply angles per step 230 and repeat the lamination theory analysis until the design goals are met. If altering ply angles does not yield the desired results, then the ply thickness must be changed per step 228 and the process repeated until the design goals are met.

By changing the ply angles slightly from a quasi-isotropic layup, the CTE in one direction can be made slightly more positive or negative. Therefore, if the CTE goal is +0.05× $10^{-6}$ in/in/° F. in one direction and −0.05×$10^{-6}$ in/in/° F. in the orthogonal direction, this carbon hybrid laminate design process applies.

Figure 3:
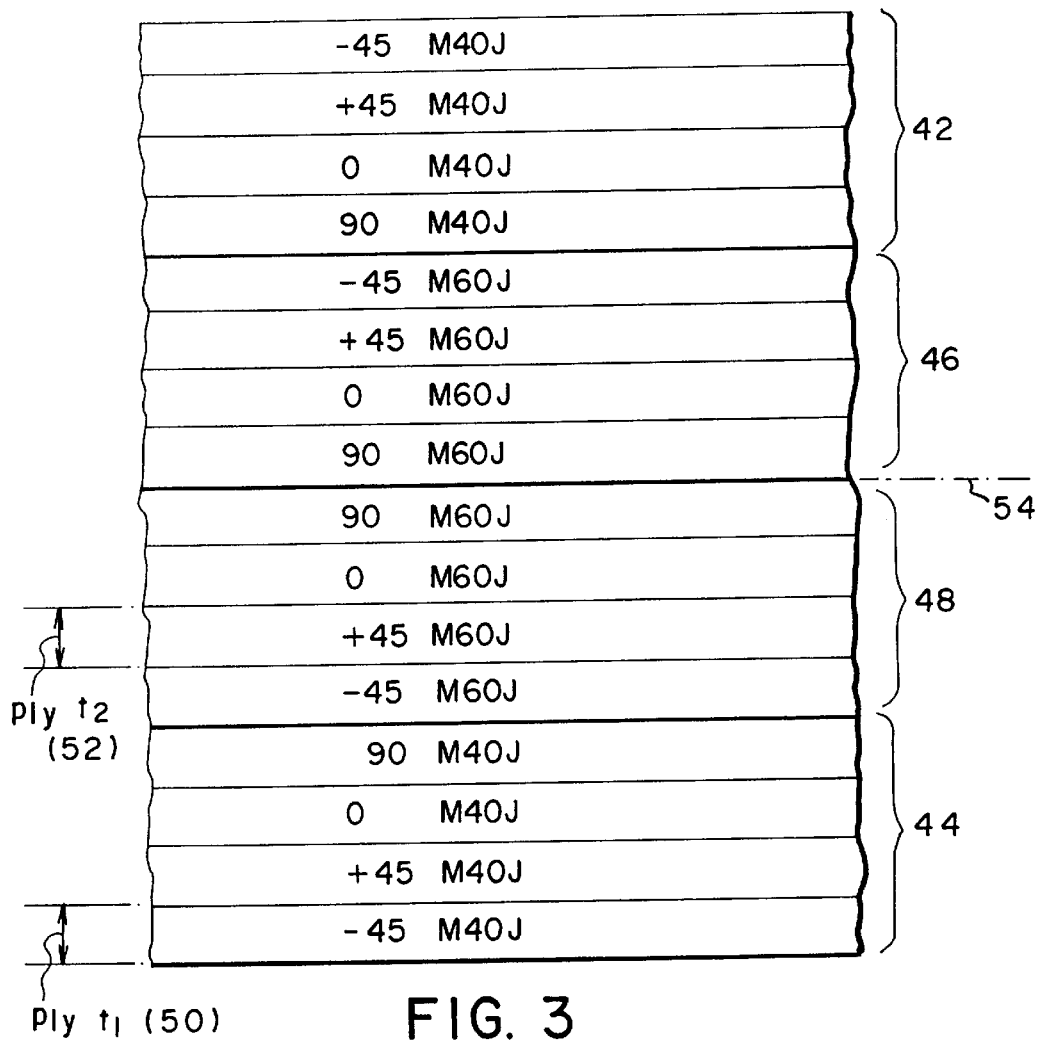
FIG. 3 is a cross-sectional view of a first embodiment of a carbon fiber hybrid laminate according to the present invention.

Referring now to FIG. 3, an example of a hybrid layup of M40J and M60J type carbon fibers at indicated ply angles which produce a near-zero CTE is presented. The lamina properties for each fiber/resin combination used in the laminated plate theory calculations are shown in the table of FIG. 4. Where $E_{11}$(Msi) and $E_{22}$(Msi) are the moduli of elasticity expressed in million pounds per square inch in the directions parallel and perpendicular to the direction of fibers in the unidirectinal lamina respectively; $G_{12}$(Msi) is the shear modulus in the plane of the unidirectional lamina; $V_{12}$ is the Poisson's ratio in the plane of the unidirectional lamina; $CTE_{11}$ and $CTE_{22}$ are the coefficients of thermal expansion in the directions parallel and perpendicular to the direction of fibers in the unidirectional lamina respectively; and Fiber Vol. (%) is the percent of carbon fiber by volume in the carbon fiber/resin combination by volume. The M40J subgroups 42 and 44 are composed of quasi-isotropic layups with the indicated ply angles that are symmetric about a midplane 54. The M60J subgroups 46 and 48 are also composed of quasi-isotropic layups that are symmetric about the midplane 54. The ply thickness of the M40J plies 50 and the M60J plies 52 are varied using the procedure described in FIG. 2 to produce an in-plane zero CTE laminate. If a slightly higher or lower CTE is required in the X and Y directions, then the ply angle orientations can be altered using step 230 described in FIG. 2. The first two rows of the Table shown in FIG. 5 summarizes the results of the two iterations required to achieve a laminate with an in-plane CTE equal to zero. Where $E_{xx}$(Msi) and $E_{yy}$(Msi) are the moduli of elasticity expressed in million pounds per square inch in the directions parallel and perpendicular to the principle direction of the laminate respectively, and $CTE_{xx}$ and $CTE_{yy}$ are the coefficients of thermal expansion in the directions parallel and perpendicular to the principle direction of the laminate respectively. Notice that the ply thickness for the M60J lamina was changed to 0.00268 inches in order to achieve an in-plane CTE equal to zero. In the example shown in the second row, the first group of carbon fiber laminate is quasi-isotropic having an in-plane CTE of $+0.375 \times 10^{-6}$ in/in/° F. and modulus of elasticity of $+10.54 \times 10^6$ psi and the second group of carbon fiber laminae is also quasi=isotropic having an in-plane CTE of $-0.168 \times 10^{-6}$ in/in/° F. and modulus of elasticity of $17.47 \times 10^6$ psi.

Figure 6:
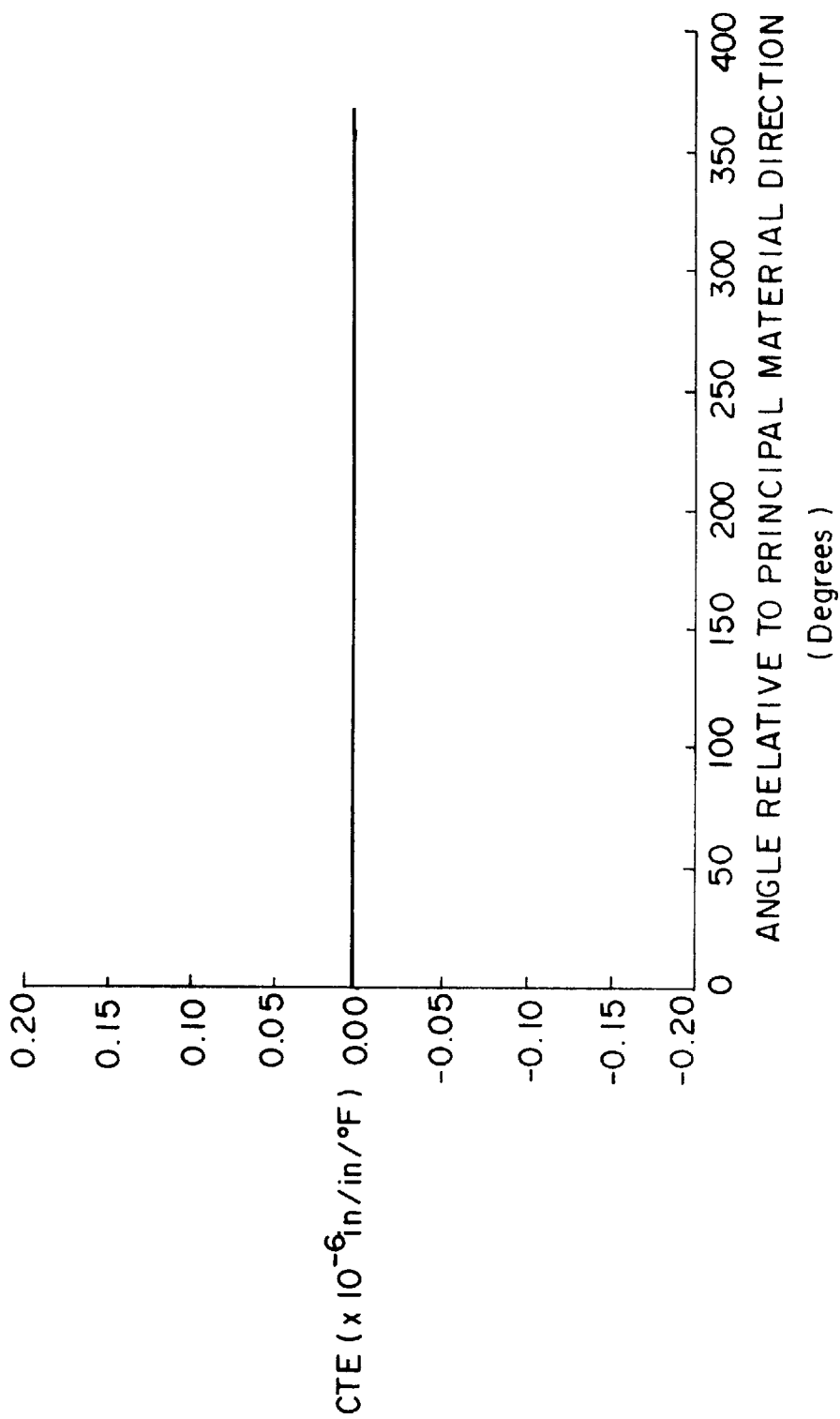
FIG. 6 is a graph of the CTE of the laminate of FIG. 3 vs. the relative angle of interest from the principal material direction.
Figure 7:
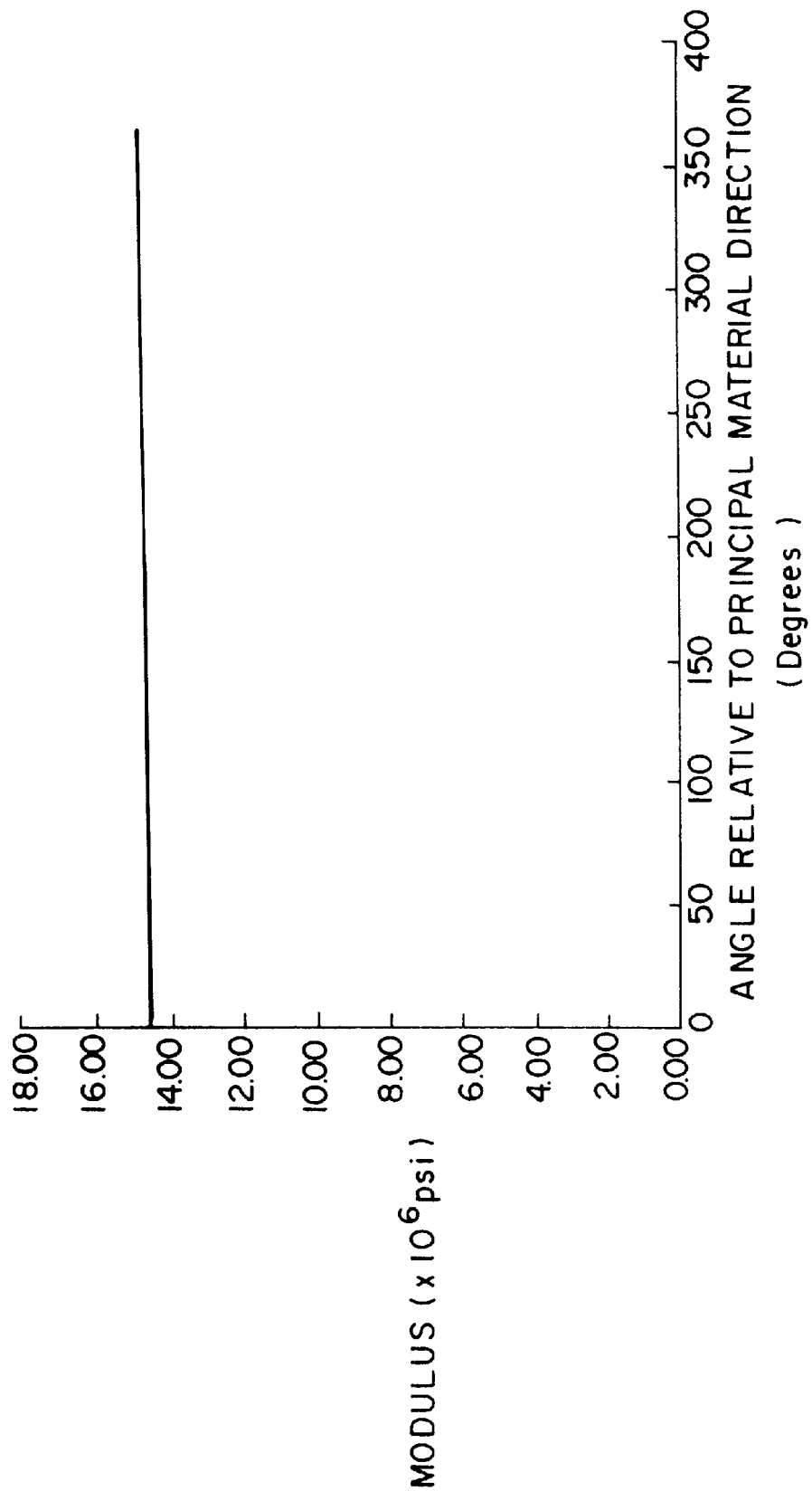
FIG. 7 is a graph of the tensile modulus of the laminate of FIG. 3 vs. the relative angle of interest from the principal material directions.

FIG. 6 is a graph of the CTE of the laminate as the angle from the principal material direction (0°) changes, while FIG. 7 is a plot of tensile modulus of the laminate as the angle from the principal material direction (0°) changes. Note that the CTE is constant and equal to zero and the modulus is constant and equal to 14.51 msi for every angle of the laminate described in row 2 of the table shown in FIG. 5.

Figure 8:
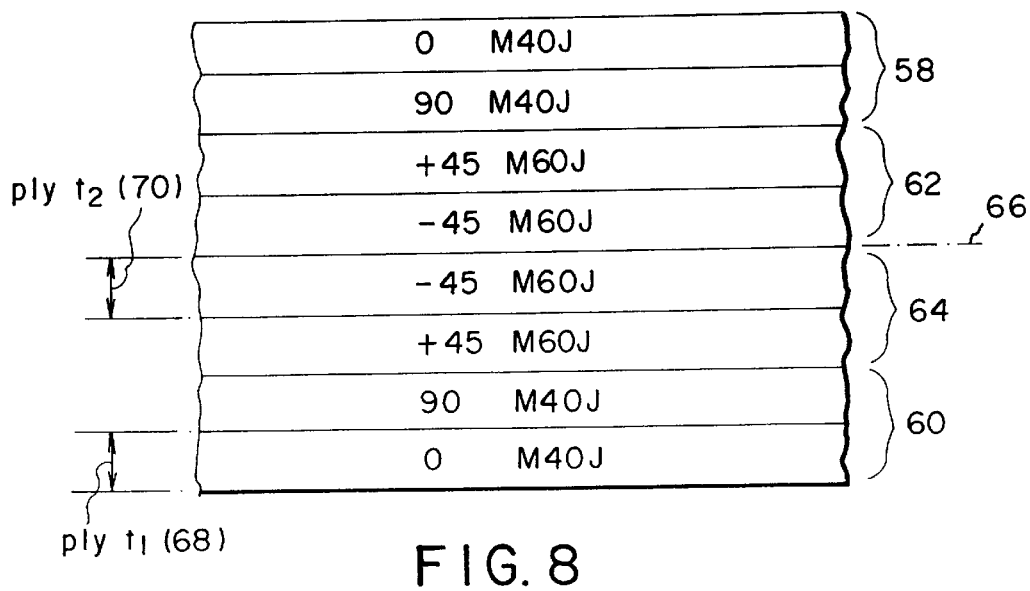
FIG. 8 is a cross-sectional view of the second embodiment of a carbon fiber hybrid laminate according to the present invention.
Figure 9:
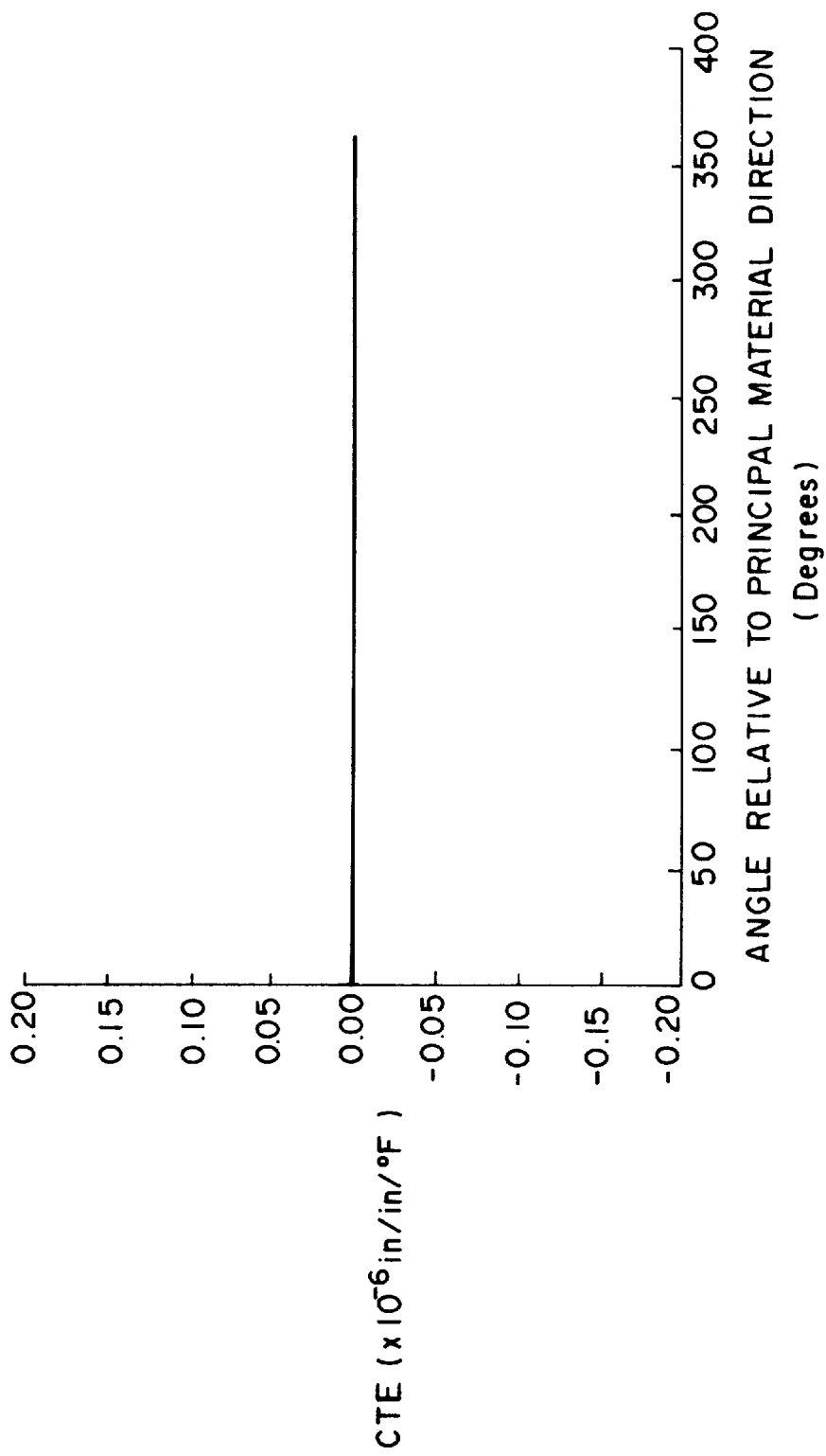
FIG. 9 is a graph of the CTE of the laminate of FIG. 8 vs. the relative angle of interest from the principal material direction.
Figure 10:
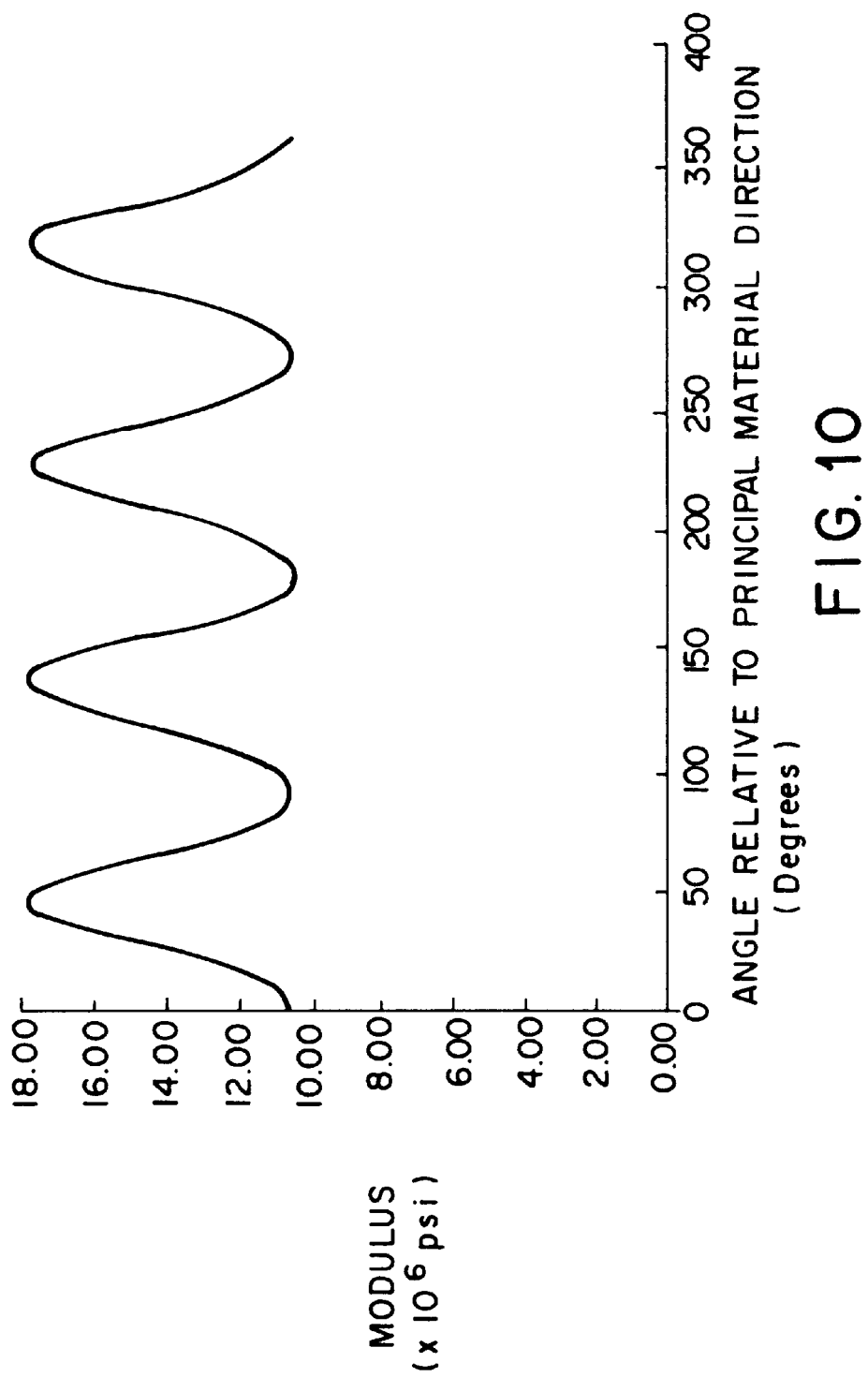
FIG. 10 is a graph of the tensile modulus of the laminate of FIG. 8 vs. the relative angle of interest from the principal material direction.

Referring to FIG. 8, a second example of a hybrid layup of M40J and M60J carbon fibers which produce a near-zero CTE is presented. The lamina properties for each fiber/resin combination used in the laminated plate theory calculations are shown in the table of FIG. 4. The M40J subgroups 58 and 60 are composed of 0° and 90° plies that are symmetric about a midplane 66. The M60J subgroups 62 and 64 are composed of +45° and −45° plies that are also symmetric about the midplane 66. The ply thickness of the M40J plies 68 and the M60J plies 70 are varied using the procedure described in FIG. 2 to produce an in-plane zero CTE laminate. The third and fourth rows of the table shown in FIG. 5 summarize the results of the two iterations required to achieve a laminate with an in-plane CTE equal to zero. FIG. 9 is a graph of the CTE of the laminate as the angle from the principal material direction (0°) changes. Note that the CTE is constant and equal to zero for every angle of the laminate described in row 4 of the table shown in FIG. 5. In this example, the modulus is not quasi-isotropic allowing the high stiffness direction to be oriented in a more optimal configuration and thus make a more efficient structure as presented in FIG. 10. If the fiber angles for the two fibers are interchanged, an in-plane zero CTE laminate with a higher modulus is obtained as shown in row 5 of the table shown in FIG. 5. In the example shown in the fourth row, the first group of carbon fiber laminae have an in-plane CTE of $+0.375 \times 10^{-6}$ in/in/° F. and modules of elasticity in the 0° direction of $1.63 \times 10^6$ psi and the second group of carbon fiber laminae comprises 0° plies and 90° plies, the second group having an in-plane CTE of $-0.168 \times 10^{-6}$ in/in/° F. and modules of elasticity in the 0° direction of $25.72 \times 10^6$ psi.

In conclusion, if a slightly higher or lower CTE is required in the X and Y directions, then the ply angle orientations can be altered using the procedure described in FIG. 2. For example, if the M60J fiber angle is changed to ±44°, then the laminate properties are altered as shown in row 6 of the table shown in FIG. 5. Obviously, the possible combinations are endless, but these examples teach the potential uses for this laminate family.

Some of the variations of the present invention are:

that symmetry of subgroups about a midplane is not required if out-of-plane bending of the laminate is either of no concern or desireable;

the order of the subgroups may be changed;

fiber types can be mixed in a subgroup;

the order of layers between subgroups can be mixed;

the number of fiber types used is not restrictive other than the cumulative + and − CTE of the types used should approximate 0;

any suitable resin or matrix material can be used in the laminate design and design process;

more than one resin or matrix material can be used in the laminate design and design process;

the angular orientation between the + and the − subgroup is not critical; and the ply angle orientation of the fiber within a subgroup can be altered to tailor the CTE of the laminated structure.

The invention has been described with reference to a preferred embodiment; However, it will be appreciated that variations and modifications can be effected by a person of ordinary skill in the art without departing from the scope of the invention.

PARTS LIST 10 carbon fiber hybrid laminate
12 subgroup
14 subgroup
16 subgroup
18 subgroup
20 midplane
22 carbon fibers
24 thermo-setting
42 M40J subgroups
44 M40J subgroups
46 M60J subgroups
48 M60J subgroups
50 M40J ply thickness
52 M60J ply thickness
54 midplane
58 M40J subgroup
60 M40J subgroup
62 M60J subgroup
64 M60J subgroup
66 midplane
68 M40J ply thickness
70 M60J ply thickness
222 design goals
224 select carbon fibers and resin
225 determine lamina properties
228 establish ply thickness
230 determine ply angles and stacking sequence
232 calculate laminate CTE using classical lamination theory
234 determine in-plane CTE's, compare to the design
236 process complete

What is claimed is:

1. A carbon fiber hybrid laminate havino a midplane, comprsing:

an integral number of first groups of carbon fiber reinforced laminae having a positive CTE, the carbon fibers in each of the first groups being arranged parallel to each other and to the midplane, and the carbon fibers in the respective groups being arranged at an angle to each other and parallel to the midplane; and an integral number of second groups of carbon fiber reinforced laminae having a negative CTE, the carbon fibers in each of the second groups being arranged parallel to each other and to the midplane, and the carbon fibers in the respective groups being arranged at an angle to each other and parallel to the midplane; and wherein the hybrid laminate has an in-plane CTE in the range of $\pm 0.2 \times 10^{-6}$ in/in/° F. and the first and the second groups of carbon reinforced laminae are bonded about the midplane, wherein the term "in-plane" refers to directions parallel to the midplane.

2. The carbon fiber hybrid laminate claimed in claim 1, wherein the first group of carbon fiber laminae is quasi-isotropic (i.e. the angles of the carbon fibers in the respective groups of carbon fibers divide a circle into equal angles) having an in-plane CTE of $+0.375 \times 10^{-6}$ in/in/° F. and modulus of elasticity of $+10.54 \times 10^6$ psi and the second group of carbon fiber laminae is quasi-isotropic having an in-plane CTE of $-0.168 \times 10^{-6}$ in/in/° F. and modulus of elasticity of $17.47 \times 10^6$ psi.

3. The carbon fiber hybrid laminate claimed in claim 1, wherein the first group of carbon fiber laminae comprises +45° plies and −45° plies, the first group having an in-plane CTE of $+0.375 \times 10^{-6}$ in/in/° F. and modulus of elasticity in the 0° direction of $1.63 \times 10^6$ psi and the second group of carbon fiber laminae comprises 0° plies and 90° plies, the second group having an in-plane CTE of $-0.168 \times 10^{-6}$ in/in/° F. and modulus of elasticity in the 0° direction of $25.72 \times 10^6$ psi.

4. A carbon fiber hybrid laminate, having a midplane, comprising:

a first sub group of carbon fibers containing fibers of differing type orientated at equal angles and having a positive CTE; and a second sub group of carbon fibers containing fibers of differing type orientated at equal angles and having a negative CTE wherein the hybrid laminate has an in-plane CTE in the range of $\pm 0.2 \times 10^{-6}$ in/in/° F., wherein the term "in-plane" refers to directions parallel to the midplane.

5. A carbon fiber hybrid laminate having a midplane, comprising:

layers of carbon fibers having a positive CTE; and layers of carbon fibers having a negative CTE that is substantially equal to the value of the positive CTE wherein the hybrid laminate has an in-plane CTE of substantially zero, wherein the term "in-plane" refers to directions parallel to the midplane.

6. The carbon fiber hybrid laminate according to claim 5, wherein the layers of positive and negative CTE fibers are symmetrically positioned about the midplane.

* * * * *